June 18, 1940.  S. RUSSELL  2,205,278
BALING MACHINE FEEDER
Original Filed Oct. 15, 1936   3 Sheets-Sheet 1

INVENTOR.
Stanley Russell,
BY
Hood + Hahn
ATTORNEYS.

June 18, 1940.  S. RUSSELL  2,205,278
BALING MACHINE FEEDER
Original Filed Oct. 15, 1936   3 Sheets-Sheet 2

INVENTOR.
Stanley Russell,
BY
Hood & Hahn.
ATTORNEYS.

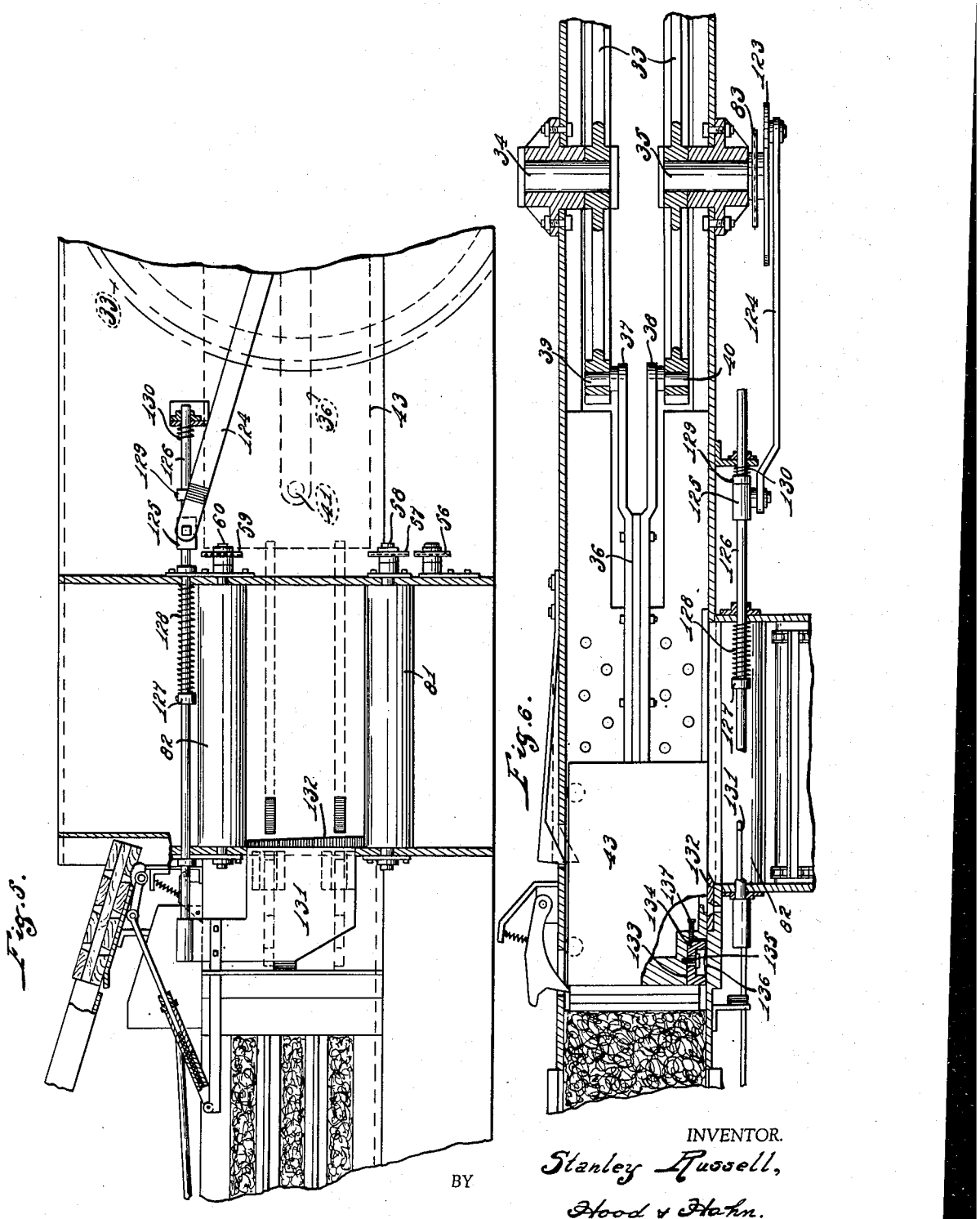

Patented June 18, 1940

2,205,278

UNITED STATES PATENT OFFICE

2,205,278

BALING MACHINE FEEDER

Stanley Russell, Racine, Wis., assignor, by mesne assignments, to The Ohio Cultivator Company Original application October 15, 1936, Serial No. 105,650. Divided and this application December 8, 1938, Serial No. 244,558

3 Claims. (Cl. 100—25)

The present application is a division of my co-pending application Ser. No. 105,650, filed October 15, 1936, and relates particularly to the baler feeding means disclosed in said co-pending application.

My invention may be embodied in the form illustrated in the accompanying drawings, attention being called to the fact, however, that the drawings are illustrative only, and that change may be made in the specific construction illustrated and described, so long as the scope of the appended claims is not violated.

Fig. 4 is a somewhat reduced horizontal section of a floating drum illustrated in Figs. 2 and 3;

Fig. 5 is an enlarged longitudinal section of a fragment of the machine, taken substantially upon the line 5—5 of Fig. 2 and looking in the direction of the arrows; and Fig. 6 is a horizontal section taken on planes perpendicular to the plane of Fig. 5, and showing substantially the same details which are illustrated in Fig. 5.

Figure 1:
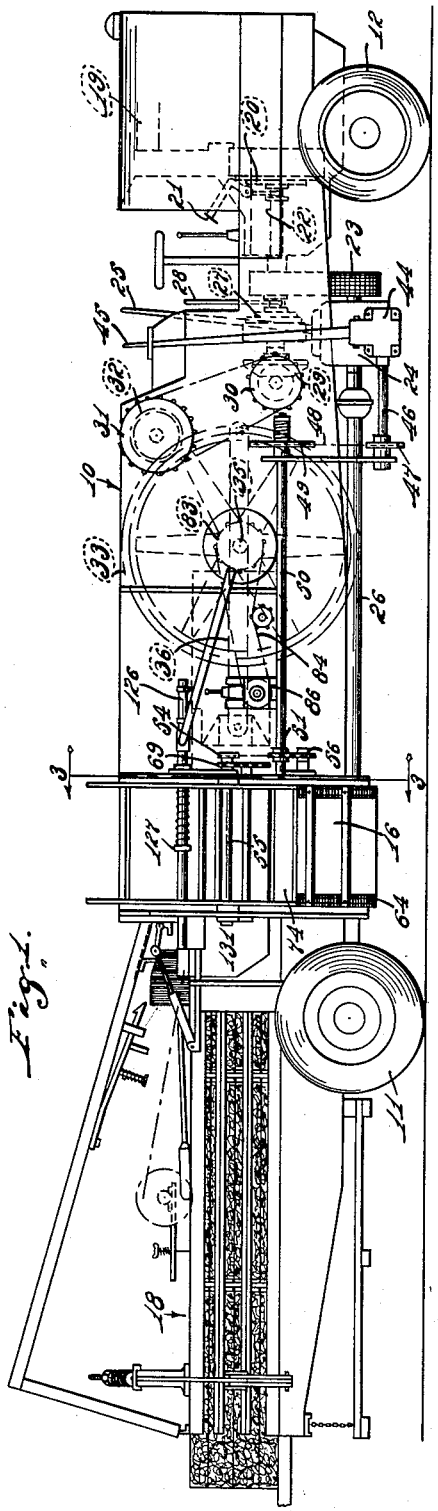
Fig. 1 is a side elevation of a baler constructed in accordance with my invention.

Referring more particularly to the drawings, it will be seen that I have illustrated an automotive vehicle, indicated generally at 10, and mounted upon traction wheels 11 and steering wheels 12. The vehicle includes a pick-up reel 13, provided with operating gathering means 14, these elements being no part of my present invention. Associated with the gathering and pick-up means is a feed mechanism comprising a chain conveyor 15 and a second chain conveyor 16, the details of which will be described hereinafter. Said mechanisms carrying material to be baled to the mouth or inlet port 17 of a baling chamber indicated generally by the reference numeral 18.

Referring, now, to Fig. 1, it will be seen that the vehicle is provided with the usual engine 19 which drives, through the conventional clutch 20, controlled by the usual pedal 21, through a standard transmission 22 to a silent chain drive 23. The drive 23 drives a selective speed transmission 24, adapted to be controlled by a lever 25; and transmitting power to a propeller shaft housed in the usual tube 26 and connected to drive the traction wheels 11 of the vehicle. Beyond the chain drive 23, the direct drive from the transmission 22 extends through a clutch 27 controlled by a lever 28 to drive a beveled gear 29 connected to drive a sprocket 30 which, through the illustrated chain, drives a sprocket 31 mounted upon a shaft carrying a pair of pinions 32 meshing with a pair of bull gears 33 mounted upon stub axles 34 and 35 (see Fig. 6). A pitman 36, having furcations 37 and 38 mounted at 39 and 40 upon the peripheries of the respective bull gears 33, is connected at its opposite end, as at 41 (see Fig. 2), to a standard or post 42 suitably mounted within a hollow plunger 43 (see Figs. 2 and 6). Obviously, rotation of the bull gears 33 will result in reciprocation of the plunger 43.

A standard power take-off 44 is connected to the transmission 24 and is controlled by a lever 45 to drive, at will, a shaft 46 carrying a sprocket 47 connected by a chain 48 to drive a sprocket 49 mounted on a shaft 50, extending longitudinally of the vehicle. Preferably, the sprocket 49 is connected to the shaft 50 through a riffle clutch.

Figure 2:
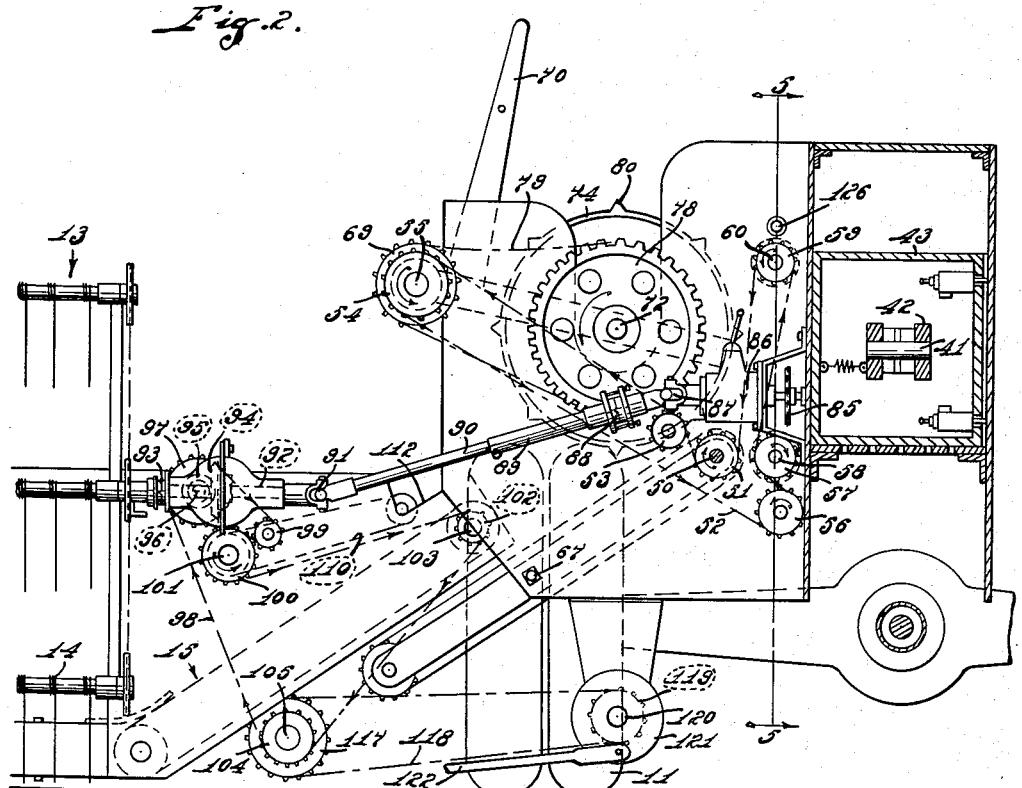
Fig. 2 is an enlarged transverse section through a fragment of the machine, showing certain features of the mechanism for driving certain elements of the organization; and showing a fragment of the mowing and pick-up mechanism of the structure illustrated in Fig. 1, together with the drive therefor.

The shaft 50 carries, near its rear end, a sprocket 51 (see Figs. 1 and 2). A chain 52 is associated with said sprocket 51, an idler sprocket 53, a sprocket 54 mounted on a shaft 55, an idler sprocket 56, a sprocket 57 mounted on a shaft 58, and a sprocket 59 mounted on a shaft 60.

The shaft 50 carries also a pair of sprockets 61, over which run two chains 62 connected by slats or cleats 63. Said chains 62 run also over two sprockets 64 mounted on a shaft 65. The shafts 50 and 65 are journaled in opposite ends of a frame 66 which provides a floor or base over which the cleats 63 slide to move the material supported on said floor. This frame 66 is mounted for oscillation on the shaft 50, being held in the position illustrated in Fig. 3, by bolts 67. The machine frame is provided with a pair of additional openings 68 for alternative reception of the bolts 67 to permit the positioning of the frame 66 in substantially a horizontal plane. The function of this arrangement is to provide a more satisfactory and efficient feeding means at times when the machine is to be used for baling from a stack, or the like, the unit 13, 14, 15 being, at such times, completely removed from the machine.

The shaft 55, which is journaled in the machine frame, carries a sprocket 69 and likewise carries a pair of bell crank levers which are mounted for oscillation about the axis of said shaft. Each lever comprises an arm 70, adapted to be used as a handle, and an arm 71, a shaft 72 being journaled in the two arms 71. Keyed to said shaft 72 are two spiders 73 which support rigidly a drum 74. The ends of the drum are closed by plates 75, 76, each of said plates being formed with an inturned flange 77 for supporting the ends of the drum 74, and each of said plates being bolted to one of the arms 71. The shaft 72 carries a sprocket 78 which, through the chain 79, is driven from the sprocket 69 on the shaft 55. The drum 74 preferably carries ribs 80 which assist in the forwarding of the material to be baled toward the mouth 17 of the baling chamber.

In operation, the drum 74 floats upon the material being forwarded by the conveyor 16; said drum being prevented from approaching said conveyor 16 too closely by straps 181 secured, by bolts 182, in any one of a plurality of desired positions. It will be seen, in Fig. 3, that there are provided a plurality of pairs of apertures 183 in the machine frame for selective reception of the bolts 182.

The shaft 58 carries a feed roll 81 mounted immediately adjacent the lower edge of the mouth 17, while the shaft 60 carries a feed roll 82 mounted immediately adjacent the upper edge of the mouth 17; said rolls 81 and 82 cooperating to insure the feeding of material into the baling chamber 18.

The stub axle 35 (see Fig. 6) carries a sprocket 83 which, through a chain 84 (see Fig. 1) drives a sprocket 85 (see Fig. 2) carried by the input shaft of a selective speed transmission 86. Said transmission 86 drives, through a universal joint 87 and a riffle clutch 88, a tubular shaft 89 which telescopically receives an end of a shaft 90 which is connected, through a universal joint 91, to drive a shaft 92 which, through a riffle clutch 93, is connected to drive the reel 13. Said shaft 92 carries a beveled gear 94 meshing with a beveled gear 95 carried on the shaft 96 which carries, likewise, a sprocket 97. Said sprocket 97 is connected, by a chain 98, to drive an idler sprocket 99, a sprocket 100 mounted on a shaft 101, a sprocket 102 mounted on a shaft 103, and a sprocket 104 mounted on a shaft 105.

The shaft 101 carries a roll 106 over which runs a belt conveyor 107 provided with cleats 108. Said conveyor 107 runs also over a roll 109 which is carried by a shaft 111 journaled in a frame 110 which is mounted for oscillation about the axis of the shaft 101. The shaft 111 rests on the frame at 112, so that the conveyor 107 floats on the material being carried on the conveyor 15. This unit 101—111 assists in moving the material upwardly along the inclined conveyor 15.

Figure 3:
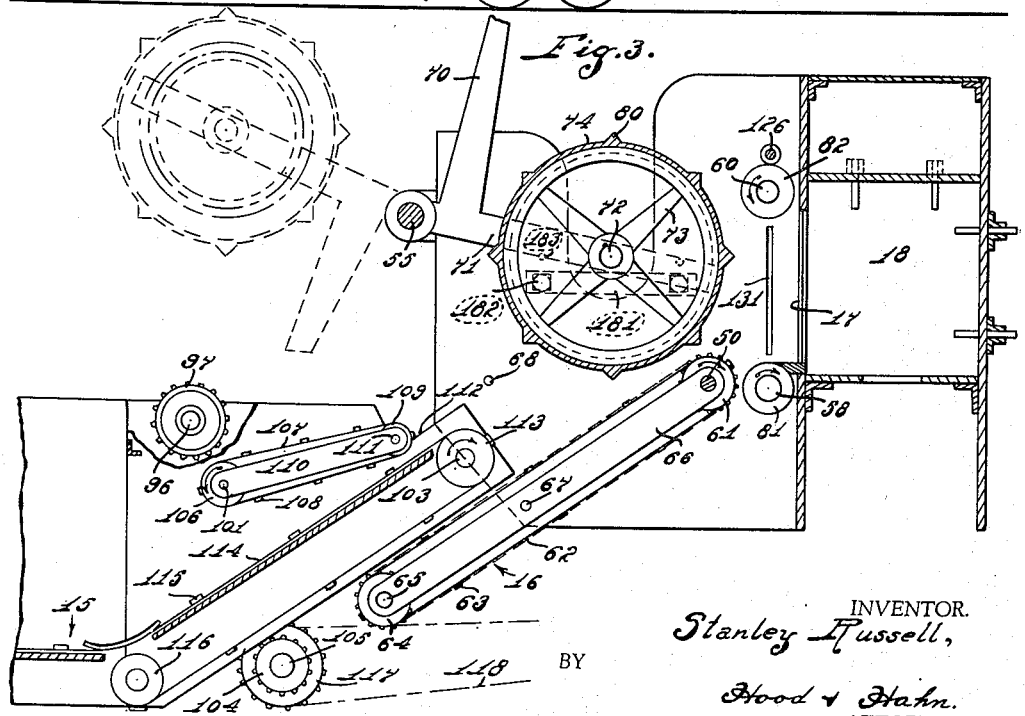
Fig. 3 is a transverse section taken substantially on the line 3—3 of Fig. 1 and looking in the direction of the arrows.

As is clearly shown in Fig. 3, the unit 15 comprises roll 113 mounted on the shaft 103, and over which runs a belt conveyor 114 provided with cleats 115. Said belt conveyor runs also over an idler roll 116, and thence to the outer end of the unit 13, so that material picked up by the gathering mechanism 14 is thrown onto the belt 114, carried up between said belt 114 and the belt 107, and deposited upon the unit 16 to be carried to the rolls 81 and 82 and thence to the baling chamber 18.

The shaft 105 carries a second sprocket 117 which, through a chain 118, drives a sprocket 119 mounted upon a shaft 120 carrying a disc 121 which operates a pitman 122 connected to reciprocate the blade of the mower mechanism (not shown).

The stub shaft 35 (see Figs. 1, 5, and 6) carries a disc 123 which operates a pitman 124 carrying, at its outer end, a sleeve 125 slidably mounted upon a rod 126 which is slidably mounted on the machine frame. Intermediate its ends, the rod 126 carries a stop collar 127 providing an abutment for one of a spring 128 sleeved on said rod and bearing, at its opposite end, against a wall of the machine, so that the rod 126 is resiliently urged toward the left, as viewed in Figs. 5 and 6. To the right of said machine wall, said rod carries a second stop collar 129 which is adapted to be engaged by the sleeve 125, upon movement of the pitman 124 to the right, whereby the rod 126 will be shifted to the right. Preferably, a second small spring 130 is sleeved on said rod 126 between said stop collar 129 and an abutment carried on the machine frame.

The rod 126 carries, at its rearward end, an element which I have termed at flag 131 which, as the rod 126 is moved toward the right will be drawn across the rearward end of the mouth 17 to clear away therefrom wisps of material jammed in that corner of the opening as a result of the shearing action of the knife 132 as the plunger 43 moves past the rearward end of the mouth 17.

The knife 132 is, as is clearly shown in Figs. 5 and 6, mounted at the rearward end of the mouth 17 of the baling chamber. At the forward end of the wall of the plunger 43 adjacent the mouth 17 of the baling chamber, said plunger is rabbeted as at 133 for the reception of a shear block 134 which is adjustably secured in place by bolts 135. Said shear block is chamfered, as at 136, so that it may be reversed to bring into cooperative relation with the blade 132 either edge of said block 134. Screws 137 are provided for adjusting the position of said block 134.

Assuming that the plunger 43 is in its retracted position, and that material is being fed into the baling chamber, it will be seen that, as the plunger is advanced or moved toward the left as viewed in Fig. 6, there will be a tendency for the plunger to carry material toward the left across the mouth 17 of the baling chamber 18. As the advancing end of the plunger 43 approaches the knife 132, there is a tendency for the material being carried with the plunger to pile up against said knife; and, when the block 134 strikes the knife 132, of course that material is cut; leaving a wad of material outside the mouth of the baling chamber and collected at the rearward edge of said mouth. Just as the block 134 begins to pass the blade 132, the sleeve 125 strikes the collar 129 and begins to shift the rod 126 toward the right, carrying the flag 131 likewise toward the right to engage that wad of material to shift it toward the middle of the mouth 17; whereby stacking of material at the knife end of the mouth 17 is prevented. As the plunger 43 starts back, the sleeve 125 is moved toward the left, and the springs 128 and 130 shift the flag 131 toward the left out of the path of advancing material.

I claim as my invention:

1. In a baler, a baling chamber formed with a port in one wall thereof, a plunger mounted for reciprocation in said chamber past said port, a knife blade fixedly secured adjacent the edge of said port farthest removed from the limit of the retractive stroke of said plunger and cooperable with said plunger, upon compressing movement of the latter, to sever any material projecting through said port, means for driving said plunger, and means synchronized with said plunger and driven by said plunger driving means for clearing severed material away from proximity to the knife-carrying edge of said port.

2. In a baler, a baling chamber formed with a port in one wall thereof, a plunger mounted for reciprocation in said chamber past said port, a knife blade fixedly secured adjacent the edge of said port farthest removed from the limit of the retractive stroke of said plunger and cooperable with said plunger, upon compressing movement of the latter, to sever any material projecting through said port, means for driving said plunger, and an element mounted outside said port and operable automatically, after each severing operation, to move severed material outside said port from adjacent said knife toward the opposite edge of said port.

3. In a machine of the class described, a vehicle having traction wheels, a prime mover, a baling chamber, a plunger reciprocable in said baling chamber, and means for feeding material to said baling chamber, a selective-speed transmission having its input shaft connected to said prime mover, a bull gear, a pitman connecting said bull gear to reciprocate said plunger, a drive train, including a clutch, connecting the output shaft of said transmission to drive said bull gear, a second selective-speed transmission, power-transmitting means connecting the output shaft of said first transmission, in advance of said clutch, to drive the input shaft of said second transmission, means connecting the output shaft of said second transmission to drive said traction wheels, a power take-off unit driven from said second transmission, and means connecting said power take-off to drive said feeding means.

STANLEY RUSSELL.